United States Patent
Lerner et al.

(10) Patent No.: US 11,823,568 B2
(45) Date of Patent: Nov. 21, 2023

(54) DYNAMIC SPEED LIMIT FOR VEHICLES AND AUTONOMOUS VEHICLES

(71) Applicant: TOYOTA MOTOR NORTH AMERICA, INC., Plano, TX (US)

(72) Inventors: Emily Lerner, Plano, TX (US); Mathew D. Gardner, Plano, TX (US); Shravanthi Denthumdas, Plano, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 519 days.

(21) Appl. No.: 16/402,117

(22) Filed: May 2, 2019

(65) Prior Publication Data

US 2020/0349833 A1 Nov. 5, 2020

(51) Int. Cl.

| G08G 1/01 | (2006.01) |
|---|---|
| G08G 1/0962 | (2006.01) |
| G05D 1/00 | (2006.01) |
| G05D 1/02 | (2020.01) |
| H04W 4/46 | (2018.01) |
| H04W 4/44 | (2018.01) |
| G08G 1/0965 | (2006.01) |
| G06N 20/00 | (2019.01) |

(Continued)

(52) U.S. Cl.
CPC ......... *G08G 1/0125* (2013.01); *G05D 1/0088* (2013.01); *G05D 1/0221* (2013.01); *G05D 1/0223* (2013.01); *G05D 1/0285* (2013.01); *G05D 1/0287* (2013.01); *G06N 20/00* (2019.01); *G08G 1/0112* (2013.01); *G08G 1/0116* (2013.01); *G08G 1/0962* (2013.01); *G08G 1/0965* (2013.01); *H04W 4/44* (2018.02); *H04W 4/46* (2018.02); *B60K 35/00* (2013.01); *B60K 37/00* (2013.01); *B60K 2370/52* (2019.05); *G05D 2201/0213* (2013.01)

(58) Field of Classification Search
None
See application file for complete search history.

(56) References Cited

U.S. PATENT DOCUMENTS

| 7,706,965 B2 | 4/2010 | Downs |
|---|---|---|
| 9,805,601 B1 | 10/2017 | Fields |

(Continued)

FOREIGN PATENT DOCUMENTS

KR  20200040501 A * 4/2020 ............. G06N 20/00

*Primary Examiner* — Isaac G Smith
*Assistant Examiner* — Jennifer M Anda
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for operating a vehicle using dynamic speed limits. A vehicle can monitor current road conditions by capturing real-time data that is indicative of a driving environment associated with a roadway being traversed by the vehicle. Using the captured real-time data, the vehicle can predict a dynamic speed limit, wherein the dynamic speed limit is a driving speed for the vehicle that is adapted for the monitored current road conditions. Additionally, the vehicle can automatically perform a driving operation for the vehicle in accordance with the dynamic speed limit, wherein the driving operation causes the vehicle to move at a driving speed that is approximately equal to the predicted dynamic speed limit.

8 Claims, 5 Drawing Sheets

(51) Int. Cl.
    *B60K 37/00*     (2006.01)
    *B60K 35/00*     (2006.01)

(56) References Cited

U.S. PATENT DOCUMENTS

| | | |
|---|---|---|
| 9,953,523 B2 | 4/2018 | Linder |
| 10,275,664 B2* | 4/2019 | Mullen ................ G08G 1/0129 |
| 2012/0059574 A1* | 3/2012 | Hada .................... G08G 1/0112 |
| | | 701/119 |
| 2015/0094941 A1* | 4/2015 | Chapman ............. G08G 1/0104 |
| | | 701/119 |
| 2016/0189540 A1* | 6/2016 | Fowe ................... G08G 1/0129 |
| | | 701/70 |
| 2017/0032402 A1 | 2/2017 | Patsiokas |
| 2018/0107216 A1 | 4/2018 | Beaurepaire |
| 2019/0049992 A1* | 2/2019 | Riess .................... G08G 1/166 |
| 2019/0375403 A1* | 12/2019 | Hu ...................... B60W 30/165 |
| 2020/0019798 A1* | 1/2020 | Stenneth ............. G06V 20/582 |
| 2020/0050209 A1* | 2/2020 | Bai .................... B60K 31/0058 |
| 2020/0133307 A1* | 4/2020 | Kelkar .................... G08G 1/22 |
| 2020/0180610 A1* | 6/2020 | Schneider ......... B60W 30/0956 |
| 2020/0183389 A1* | 6/2020 | Kim ................... B60W 60/0025 |
| 2020/0307578 A1* | 10/2020 | Magolan ............... B60W 20/00 |
| 2021/0009158 A1* | 1/2021 | Kim ................ G08G 1/096827 |

\* cited by examiner

DYNAMIC SPEED LIMIT FOR VEHICLES AND AUTONOMOUS VEHICLES

TECHNICAL FIELD

The present disclosure relates generally to systems and methods for dynamic vehicle control for vehicles having adaptive features and for automated vehicles. More specifically, systems and methods that enable a vehicle to predict a dynamic speed limit by using federated learning to access road conditions, traffic, existing infrastructure (e.g., posted speed limits, and traffic signals, etc.), and related information from multiple communication points.

DESCRIPTION OF RELATED ART

Some vehicles include computer-controlled operational modes, such as vehicles having adaptive cruise control mode and automated vehicles, in which a computing system is used to navigate and/or maneuver the vehicle along a travel route. During adaptive cruise control operation, for example, the driving speed of the vehicle can be limited by various factors, such as preceding vehicles travelling at slower speeds. In most cases, preceding vehicles are under the control of a human driver that is abiding by static speed limits. However, static speed limits have limitations that can, in turn, impact computer-controlled operational modes. Many static speed limits displayed by the road infrastructure reflect a highest driving speed that is appropriate under exemplary conditions (e.g., no traffic congestion, dry roads, etc.) for a respective area. Nonetheless, these exemplary conditions may not reflect the real-time conditions on the road, which are affected by numerous variables and subject to change. For this reason, it can be helpful for a vehicle computing system to employ dynamic speed limits, which can be determined using real-time traffic monitoring, and federated learning from multiple communication points. Vehicles can use dynamic speed limits that are adjustable, rather than static, and can be updated in tandem with the changing road conditions to enhance navigation and/or maneuver capabilities.

BRIEF SUMMARY OF THE DISCLOSURE

In accordance with one embodiment, a method comprises a vehicle monitoring, current road conditions by capturing real-time data that is indicative of a driving environment associated with a roadway being traversed by the vehicle. The method may further involve the vehicle predicting a dynamic speed limit based on the captured real-time data, wherein the dynamic speed limit comprises a driving speed for the vehicle that is adapted for the monitored current road conditions. Further, the method may automatically perform a driving operation in accordance with the predicted dynamic speed limit, wherein the driving operation causes the vehicle to move at a driving speed that is approximately equal to the predicted dynamic speed limit.

In accordance with another embodiment, a system comprises a plurality of vehicles communicatively coupled to transmit real-time data that is captured by each of the plurality of vehicles. The captured real-time data can be indicative of a driving environment associated with a roadway being traversed by the plurality of vehicles. The system may also include an infrastructure device communicatively coupled to the plurality of vehicles for transmitting initial speed limit data. At least one of the plurality of vehicles can comprises a control. Furthermore, the control unit of the vehicle can receive the real-time data from the plurality of vehicles and receive the initial speed limit data from the infrastructure device. Accordingly, the control unit of the vehicle may dynamically adjust the initial speed limit data based on a consensus of the real-time data received from the plurality of vehicles. Additionally, the control unit of the vehicle may automatically perform a driving operation for the at least one vehicle in accordance with the dynamically adjusted speed limit, wherein the driving operation causes the at least one vehicle to move at a driving speed that is approximately equal to the dynamically adjusted speed limit.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

The embodiments disclosed herein include systems and methods for implementing dynamic speed limits. In many instances, a speed limit for a particular location are values determined by an entity, for example a state municipality. The entities commonly base static speed limits on the prevailing road conditions for an area at time of the determination, which can be several years prior. Typically, the speed limit for an area is posted in a manner that is mainly static, such as being displayed on a common metal street sign. These signs indicating the speed limit can remain erected in the same area for long lengths of time (e.g., years). As an example, a static speed limit selected for roads nearby a school can be substantially reduced as deemed appropriate for a school zone. However, over time, developments in the surrounding area can also impact the associated road conditions. Referring back to the example, a school closure may eliminate the need for a school zone, and the reduced speed limit. Nonetheless, the static speed limit may remain posted even after the school is closed, potentially causing unnecessary traffic slow-downs and bottlenecks. Additionally, a static speed limit may reflect a highest driving speed that is appropriate under exemplary conditions (e.g., no traffic congestion, dry roads, etc.), as opposed to the safest speed in response to the current road conditions.

Moreover, a static speed limit may fail to suggest the most appropriate driving speed during certain extreme circumstances, including but not limited to: hazards; road construction; road closures; severe weather (e.g., fog, snow, rain, etc.); traffic congestion; and the like. According to the embodiments, a vehicle can include the capability to consider such real-time variables that may affect current road conditions and can control its operation using a dynamic speed limit that has been adapted for the currently existing conditions. In some cases, a dynamic speed limit that has been dynamically adjusted for the current road conditions may differ from the static speed limit that has been posted for the area. As discussed in further detail below, a vehicle including dynamic speed limit capabilities can analyze real-time data to assess for current road conditions and predict a dynamic speed limit that is optimized for the currently prevailing conditions.

Figure 1:
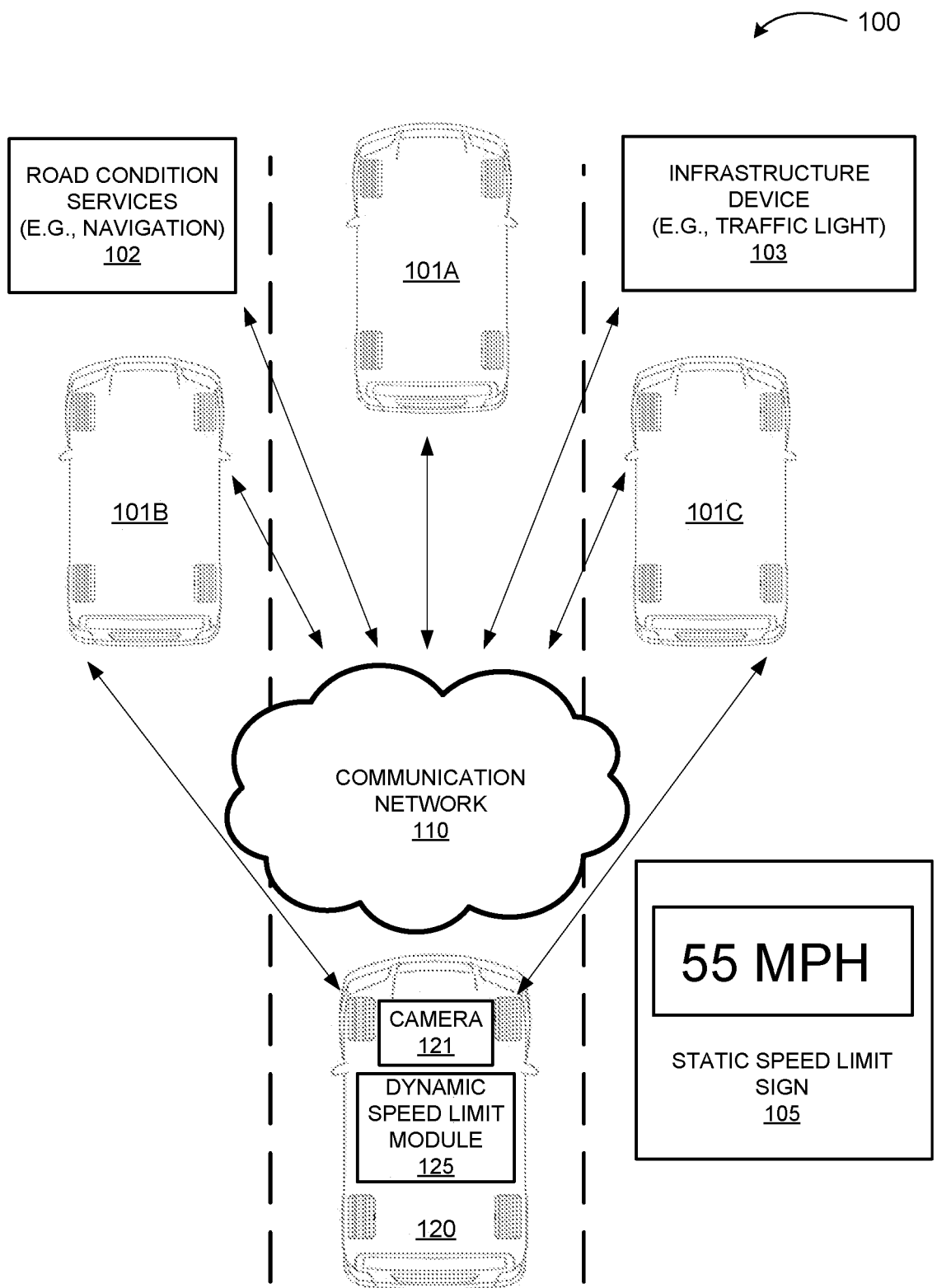
FIG. 1 is an example of a vehicle-infrastructure system with which embodiments of the dynamic speed limit systems and methods disclosed herein may be implemented.

FIG. 1 illustrates a vehicle-infrastructure system 100 for implementing the dynamic speed limits techniques disclosed herein. As referred to herein, dynamic speed limits can be generally described as adaptive (or dynamically adjustable) values relating to a measurement of speed for motorized vehicles, such as miles per hour (MPH). Dynamic speed limits may be used in semi-autonomous (e.g., partially computer-controlled) or fully autonomous operations for a vehicle. According to the embodiments, vehicles include the capability to determine dynamic speed limits that are dynamically adjustable using real-time data, and thus can be adaptively updated in response to prevailing traffic volume, traffic incidents, and/or weather conditions reflected by the real-time data. Restated, a dynamic speed limit is a driving speed that has been deemed most appropriate and/or optimized by the vehicle for the current road conditions. In some cases, the dynamic speed limit may differ from a static speed limit (e.g., speed limit posted on highway signage). Dynamic speed limits can enhance computer-controlled features of vehicles in a manner that improves driving safety (e.g., a reduction of potential crashes), provides uniform traffic flow, and optimizes driving performance of vehicles (e.g., fuel efficiency) for road conditions.

FIG. 1 generally illustrates a vehicle 120 traveling on a roadway, where vehicle 120 is shown to have the disclosed dynamic speed limit capabilities. In some embodiments, the dynamic speed limit capabilities are implemented as an operational mode for vehicle 120. That is, a driver of vehicle 120 may be able to selectively activate or deactivate a dynamic speed limit mode as desired. For the purposes of discussion, vehicle 120 is described in reference to FIG. 1 having the dynamic speed limit mode activated, thereby enabling it to perform the dynamic speed limit techniques. As used herein, a "vehicle" is any form of motorized transport. In the illustrated example, vehicle 120 and the plurality of nearby vehicles 101A-101C are automobiles. For purposes of illustration, the embodiments will be described here with respect to automobiles. However, it should be appreciated that the dynamic speed limit techniques disclosed herein are not limited to automobiles. The dynamic speed limit systems and methods disclosed herein may be implemented with any of a number of different vehicles and vehicle types. For example, the dynamic speed limit systems and methods disclosed herein may be used with automobiles, trucks, motorcycles, boats, recreational vehicles and other like on- or off-road vehicles. In addition, the principals disclosed herein may also extend to other vehicle types as well.

FIG. 1 also shows a static speed limit sign 105, which can be signage along the roadway, such as a highway sign or street sign. The static speed limit sign 105 displays a static speed limit, and can be a traditional metal sign, an electronic highway sign, variable message sign, and the like. The static speed limit sign 105 can placed in a location such that a static speed limit can be easily observed by drivers while operating a vehicle, such as illustrated vehicles 120 and 101A-101C. In the example of FIG. 1, the static speed limit sign 105 indicates that a speed limit of "55 MPH" is suggested for the area. Accordingly, a driver operating their vehicle at a speed greater than 55 MPH can read the sign 105 and decelerate to adhere to the suggested limit.

As alluded to above, the static speed limit may reflect a highest driving speed that is appropriate under exemplary conditions, failing to reflect the most appropriate driving speed during certain extreme circumstances (e.g., hazards, road construction, road closures, severe weather, traffic congestion; and the like). By considering such real-time variables that may affect current road conditions, vehicle 120 can control its operation using a dynamic speed limit that is determined by dynamic speed limit module 125. It should be understood that a dynamic speed limit, being dynamically adjusted for the current road conditions, may different from the static speed limit posted on the static speed limit sign 105. As discussed in further detail, the dynamic speed limit module 125 is configured to analyze real-time data indicative of road conditions to predict a dynamic speed limit that is optimized for the current road conditions.

The vehicle-infrastructure system 100 can include the communication network 110, one or more nearby vehicles 101A-101C (e.g., present within the same portion of a road), and road condition service(s) 102, such as navigation services and/or weather services. Additionally, the system 100 is shown to include infrastructure device(s) 103, for example a traffic signal having communication connectivity, as described in greater detail below. The abovementioned components of system 100 can be communicatively linked through the communication network 110. As used herein, the term communication network can include direct or indirect connections though a communication channel or pathway or another component or system.

Communication network 110 can be one or more components designed to transmit and/or receive information from one source to another. The communication network 110 can be implemented as, or include, without limitation, a dedicated short-range communication (DSRC) network, a wide area network (WAN), a local area network (LAN), the Public Switched Telephone Network (PSTN), a wireless network, a mobile network, a Virtual Private Network (VPN), the Internet, and/or one or more intranets. The communication network(s) 110 further can be implemented as or include one or more wireless networks, whether short or long range. For example, in terms of short range wireless networks, the communication network(s) 110 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 110 can include a mobile, cellular, and or satellite-based wireless network and support voice, video, text, and/or any combination thereof. Examples of long range wireless networks can include GSM, TDMA, CDMA, WCDMA networks or the like. The communication network 110 can include wired communication links and/or wireless communication links. The communication network 110 can include any combination of the above networks and/or other types of networks. The communication network 110 can include one or more routers, switches, access points, wireless access points, and/or the like. In one or more arrangements, the communication network 110 can include Vehicle-to-Everything (V2X) technologies (including Vehicle-to-Infrastructure (V2I) and Vehicle-to-Vehicle (V2V) technologies), which can allow for communications between the nearby vehicle(s) 101A-101C, the vehicle 120 and any nearby roadside communications nodes and/or infrastructure device 103.

Figure 2:
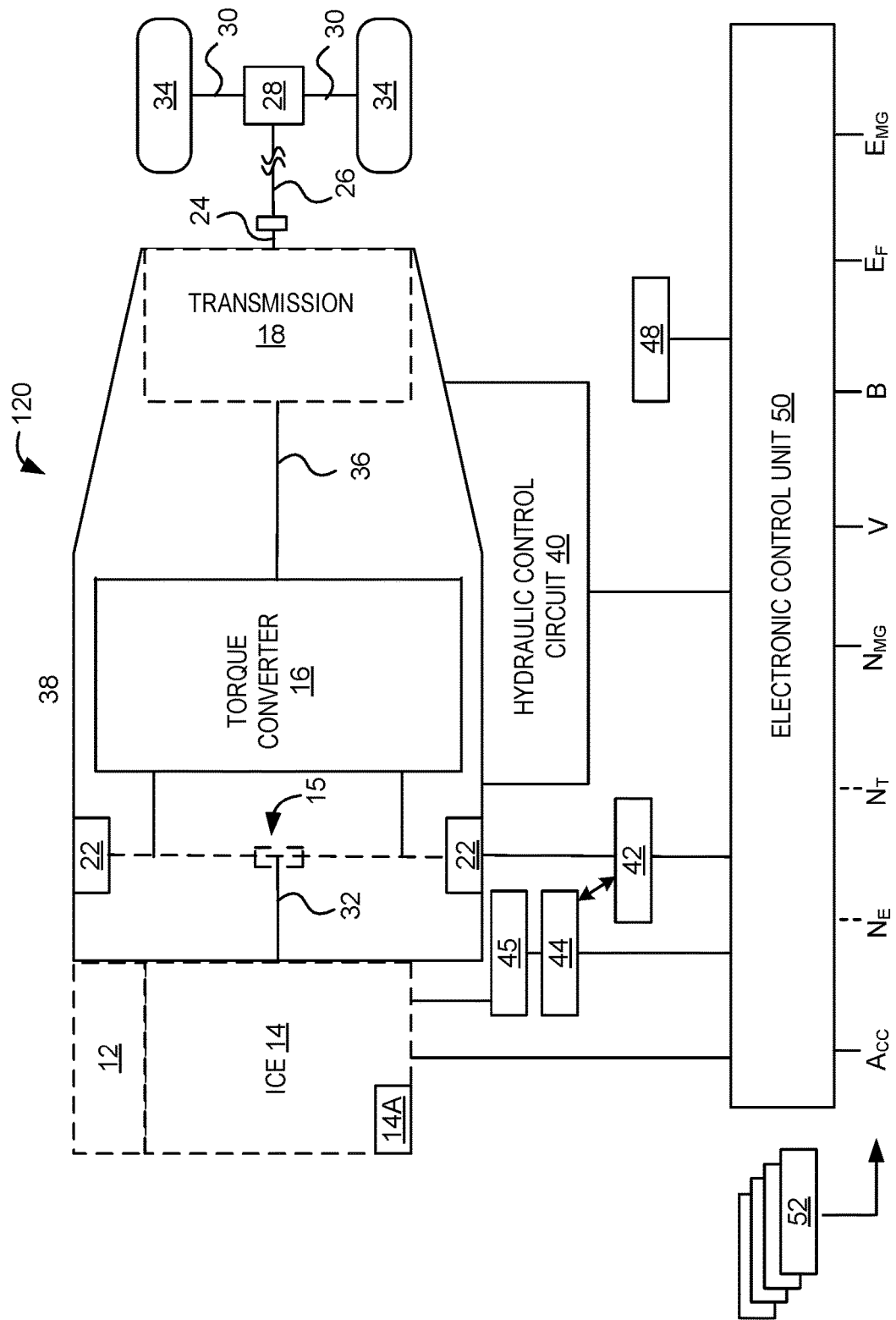
FIG. 2 is a schematic representation of an example vehicle with which embodiments of the dynamic speed limit systems and methods disclosed herein may be implemented.

The vehicle 120 can include one or more sensors, shown in greater detail in FIG. 2. Sensors of vehicle 120 can capture real-time data enabling the vehicle 120 to monitor the current road conditions. The one or more sensors can be configured to capture, generate, and/or acquire data that is characteristic of a surrounding driving environment, inclusive of objects (e.g., buildings, pedestrians, other vehicles, etc.), terrain (e.g., trees, weather, etc.), traffic, weather, and other traits of the outside area surrounding the vehicle 120. In some examples, the sensor(s) can capture, generate, and/or acquire data corresponding to: a location (e.g., a relative location, a global location, coordinates, etc.) of vehicle 120; a heading (e.g., a relative heading, an absolute heading, etc.) of vehicle 120; and/or a change in heading of the vehicle 120; and data pertaining to a surrounding driving environment (e.g., traffic volume, weather, hazards), just to name a few possibilities. In some embodiments, the one or more sensors of vehicle 120 are configured to continuously monitor road conditions while operating (e.g., driving), thereby allowing dynamic speed limits to be adjusted to newly collected real-time data as often as deemed necessary and/or appropriate. In other embodiments, the sensors are configured to monitor periodically, irregularly, randomly, or in response to a request or a command, or in response to a condition or event.

In FIG. 1, vehicle 120 includes a camera 121. Camera 121 is illustrated as a front-facing camera positioned near the front section of vehicle 120 and arranged such that the imaged field of view includes the surrounding driving environment. The camera 121 can be implemented as a wide-angle camera for achieving a desired imaged field of view that is indicative of pertinent road conditions, such as traffic volume, weather, hazards, and the like. It should be appreciated that the placement of the camera 121 in FIG. 1 is for purposes of illustration, and that various characteristics of the camera 121 such as position, distance (from the vehicle 120), orientation, angle, resolution, and the like can be adjusted as desired and according the specific application. In an example operation, the camera 121 captures images in real-time of the surrounding driving environment in which the vehicle 120 is location, such as the roadway that it is currently traveling, or one or more portions thereof. For instance, camera 120 can image portions of the roadway illustrated in FIG. 1, capturing visual data deemed relevant for determining the current road conditions, such as the surface of the road (e.g., presence of ice or rain), lane occupancy, nearby vehicles 101A-101C, and the like.

As sensors of vehicle 120 monitor the surrounding driving environment, the dynamic speed limit module 125 can obtain the generated real-time data. Referring back to the example, real-time data communicated to dynamic speed limit module 125 includes the visual data captured by camera 121. Furthermore, in some cases, the dynamic speed limit module 125 includes logic to analyze the real-time data, such as the images generated by camera 121, to determine the current road conditions for the location in which the vehicle 120 is traveling. The dynamic speed limit module 125 can be configured to determine whether the current road conditions include extreme road conditions. As alluded to above, various extreme road conditions may require a speed limit that is dynamically adjusted to be more suitable for the current circumstances (as compared to the static speed limit).

In referring to a previous example, a driver operating vehicle 120 may be traveling at 55 MPH, posted by static speed limit sign 105. Camera 121 can image the surrounding driving environment, including the road's surface, to capture real-time data reflecting that the area where vehicle 120 is currently located is experiencing heavy rain. Although legally driving in accordance with the static speed limit of 55 MPH, vehicle 120 may be moving at a speed that is not safe in the presence of wet roadways due to rain. Subsequently, the dynamic speed module 125 can use the monitored road conditions to adaptively predict a dynamic speed limit that is appropriate for operating vehicle 120. Referring again to the rain example, the dynamic speed limit module 125 may analyze the real-time data captured by camera 121 and predict that a significantly reduced dynamic speed limit of 35 MPH is appropriate, in response to the detected extreme weather.

As discussed in greater detail below, the capabilities of the dynamic speed limit module 125 can be enhanced by leveraging the communicative connectivity of system 100. The dynamic speed limit module 125 can implement various federated learning aspects, including collecting additional real-time data that is also indicative of the current road conditions from communication points external to vehicle 120, such as nearby vehicles 101A-101b, road condition services 102, and infrastructure device 103. Therefore, an increased amount of data can be employed in training the machine learning model(s) utilized by dynamic speed limit module 125, which in turn increases the accuracy of the model(s).

According to an embodiment, the dynamic speed limits module 125 includes algorithm(s) and/or model(s) to predictively map an output, namely a dynamic speed limit, to the received input of real-time data. FIG. 1 serves to illustrate that real-time data from the distributed communication points in system 100 can be fed as input into the dynamic speed limit module 125. Accordingly, the dynamic speed limit module 125 has a robust data set that can be utilized for its prediction modeling techniques. As a general description, dynamic speed limits module 125 can function as a closed-feedback loop, continuously iterating the steps of: real-time data monitoring; determining/estimating a current condition (or state) of the roadway; predicting a dynamic speed limit; and optimization. For example, vehicle sensors provide real-time data indicative of current road conditions, which can be inputs to a predictive model that, in turn, predicts an appropriate operating speed for the current state. Moreover, the algorithm(s) and/or model(s) of the dynamic speed limits module 125 can be implemented as machine learn processes that trains itself from the multiple data sets and improves over time (without human intervention). As an example, a model for speed prediction can use equations that express a relationship between speed and a dynamic behavior of traffic, and further evaluates the predicted speeds over time. Various prediction models can be used by dynamic speed limit module 125, where variables such as weather, traffic, and vehicle characteristics (e.g., tire wear, brake pad wear) can be injected into the model to generate real-time estimates for predicting an operating speed that is optimal for the current road conditions, namely a dynamic speed limit. Furthermore, as alluded to above, the system 100 can leverage the communicative connectivity to enabled federated learning, where the training data for the machine learning algorithms is distributed over the various communication points.

In some embodiments, the dynamic speed limit module 125 may be a component or group of components, such as circuitry that is configured to execute, implement, and/or perform any of the processes or functions of dynamic speed limits described herein. In some cases, the dynamic speed limit module 125 can be instructions executed by one or processors of vehicle 120, which when executed by the processors performs the dynamic speed limits functions described herein.

According to the embodiments, federated learning aspects can involve collecting additional real-time data from multiple communication points distributed throughout system 100. Thereafter, the dynamic speed limit module 125 can apply the additional real-time data to further optimize an initially predicted dynamic speed limit. It should be understood that the initially predicted dynamic speed limit may be based on real-time data captured directly by vehicle 120. That is, vehicle 120 can independently monitor the current road conditions using its sensors and predict a dynamic speed limit without communicating with the other elements of system 100. Nonetheless, as a general concept in machine learning, the presence of more data (e.g., increasing the size of the data set) results in better performing and more accurate models. Accordingly, the dynamic speed limit module 125 can be configured to operate in accordance with the federated learning principles described, using an increased amount of collected real-time data collected from nearby vehicles 101A-101C, infrastructure device(s) 103, and road condition services 102, for example. By applying federated learning, the dynamic speed limit module 125 can enhance the techniques and improve the reliability of the dynamic speed limit prediction.

As seen in FIG. 1, a vehicle-infrastructure system 100 can be implemented to include a communication network 110, which enables cooperative communication for the exchange of data between vehicle 120 and one or more components external to the vehicle 120, such as additional vehicles 101A-101C, road condition services 102, and infrastructure device(s) 103. Examples of such communication include vehicle-to-vehicle (V2V) and vehicle-to-infrastructure (V2I) communications. In referring to the federated learning aspects described above, vehicle 120 can use V2V communications to collect real-time data from nearby vehicles 101A-101C. As a result, the dynamic speed limit module 125 can improve the vehicle's 120 awareness of the current road conditions based on the varying perspective of the other vehicles 101A-101C, and increased data points and yield a more optimal dynamic speed limit improving the overall performance of the system.

System 100 can include one or more nearby vehicles 101A-101C. In the example shown in FIG. 1, the nearby vehicles 101A-101C may be traveling on the same roadway as vehicle as 120. A "nearby vehicle" can include any vehicle within the sensor range of the vehicle 120. Alternatively or in addition, the nearby vehicles 101A-101C can include vehicles within a predetermined distance from the vehicle 120. For example, the nearby vehicles 101A-101C can include vehicles within 100 meters. The nearby vehicles 101A-101C can be those vehicles that are located within the sensor range of the 120 and in which there is no other vehicle located between it and the vehicle 120 and can also include vehicles that are separated from vehicle 120 by one or more other vehicles. The nearby vehicles 101A-101C can be located in front of the vehicle 120, behind the vehicle 120, and/or nearby the vehicle 120 in a substantially lateral direction. For purposes of brevity, the nearby vehicles 101A-101C can monitor for current road conditions and generate real-time data in a manner that is similar to the process discussed in reference to vehicle 120 and therefore not repeated in detail. Each of the nearby vehicles 101A-101C can transmit real-time data, from their respective sensors, relating to the current road conditions, via the communications network 110. Additionally, the vehicle 120 can directly receive the real-time data from the nearby devices 101A-101B.

In some instances, one or more of the nearby devices 101A-101C can also include the dynamic speed limit capabilities disclosed herein. Thus, vehicle 120 may cooperatively communicate dynamic speed limits with other vehicles, where dynamic speed limits that have been predicted by other vehicles are received, and its own predicted dynamic speed limits are transmitted to the other vehicles. For example, vehicles 101A-101C can each independently predict a dynamic speed limit based on their respective monitoring of the road conditions. Subsequently, vehicle 120 can receive a dynamic speed limit from each of the vehicles 101A-101C, respectively using V2V communication. Then, vehicle 120 can use the multiple received dynamic speed limits to verify its own predicted speed limit and/or use during optimization. Additionally, vehicle 120 can transmit a dynamic speed limit it has predicted to vehicles 101A-101C using V2V communication.

Also, as illustrated in FIG. 1, real-time data can be collected from infrastructure device(s) 103. Collecting data from infrastructure device(s) 103 further increases the amount of data available for the training model(s) of dynamic speed limit module 125, as alluded to above. Infrastructure device(s) 103 can include components used to support the roadway system, such as cameras, traffic lights, lane markers, streetlights, signage, and parking meters. Infrastructure device(s) 103 can include communication devices, for example V2I sensors, which enables the wireless bi-directional connectivity for V2I communication. The real-time data from the infrastructure device(s) 103 can be communicated to vehicle 120 over an ad hoc V2I network, using dedicated short-range communication (DSRC) frequencies to transfer the data. In some cases, the real-time data provided by the infrastructure device(s) 103 include information relating to road-conditions, the static speed limit, traffic congestion, accidents, constructions zones, and the like. In an example, vehicle 120 can receive a static speed limit from the infrastructure device(s) 103. Thereafter, vehicle 120 can dynamically adjust the static speed limit received by the infrastructure device(s) 103. Using the dynamic speed limit module 125, a static speed limit can be an initial value that is adapted to generate another operating speed deemed most appropriate for the monitored road conditions (based on the captured real-time data). In some cases, the vehicle 120 can communicatively receive a static speed limit corresponding to its current location using other mechanisms (e.g., entered as input by driver, received from navigation services). Also, the dynamic speed limit module 125 may apply a received static speed limit as a variable to the speed prediction models discussed above.

Also, FIG. 1 illustrates that system 100 can include one or more road condition services 102. Communication between vehicle 120 and road condition services 102 can provide a more robust system, which leverages the vast amounts of real-time data generated and analyzed by these services 102. As vehicle 120 receives additional real-time data from road condition services 102 pertaining to current road conditions, the machine learning aspects of dynamic speed limit module 125 are further enhanced, and the reliability of the predicted dynamic speed limit is improved. The road condition services 102 can be remote computer devices, such as servers hosting information and/or software applications relating to road conditions. The road condition services 125 can then provide the information to vehicle 120 via network connectivity. For instance, the road condition services 102 can support a navigation application. A navigation application can be used by vehicle 120 to determine its geographic location and receive information related to a travel route and the associated roadways. Furthermore, a navigation application provided by road condition services 102 can provide a mapping application that displays an electronic map using real-time data. The map can be visual and/or graphical output in a dashboard display of vehicle 120, for example. The map can include information for geographical areas, roads, traffic control devices, road markings, structures, features, and/or landmarks in the one or more geographic areas that can be continuously updated (in real-time) as vehicle 120 continues to travel to reflect the most recent information. Navigation application provided by road condition services 102 can also include traffic related data, such as traffic speed, traffic volume, congestion, construction sites, and the like. As an example, a map provided by road condition services 102 can include information on past and/or present speed information for nearby vehicles 101A-101C also traveling on the same roadway. Thus, the real-time data presented by road condition services 102, such as the map, can be used by the dynamic speed limit module 125 for speed predictions. Conversely, the navigation application provided by road condition services 102 can include road conditions that are favorable for driving, such as clear roadways (e.g., dry surfaces) and no traffic congestion. In the case of favorable road conditions, the dynamic speed limit module 125 can predict a speed limit that is optimal for a vehicle's performance (as opposed to focusing on safety in extreme conditions). For instance, dynamic speed limit module 125 can predict an increased operating speed in light traffic, so as to improve the fuel efficiency for vehicle 120. In some cases, road condition services 102 can provide to vehicle 120 a static speed limit corresponding to a determine geographic location. Data indicating a static speed limit can also be utilized by the dynamic speed limit module 125 for speed predictions.

Similarly, road condition services 102 can provide real-time data pertaining to weather conditions. The road conditions services 102 can support a weather application, which notifies the vehicle 120 of current weather conditions for its determined geographic location. The weather application provided by road condition services 102 can also indicate severe weather conditions that may impact road conditions and/or the surrounding driving environment, such as fog, snow, low temperatures (e.g., ice), rain, and the like. The real-time data relating to weather that is provided by road condition services 102 to vehicle 120 can also transferred to the dynamic speed limit module 125 for speed predictions. It should be appreciated that road condition services 102 are not limited to data relating to weather and traffic. In some cases, the road condition services 102 are capable of communicate any data that is deemed appropriate for determining, or otherwise estimating, current road conditions for vehicle 120. Accordingly, data transmitted from the road condition services 102 can also be used by the dynamic speed limit module 125 as deemed necessary to implement the disclosed dynamic speed limit techniques.

According to an embodiment, vehicle 120 can be an autonomous vehicle. As used herein, "autonomous vehicle" means a vehicle that configured to operate in an autonomous operational mode. "Autonomous operational mode" means that one or more computing systems of the vehicle 120 are used to navigate and/or maneuver the vehicle along a travel route with a level of input from a human driver which varies with the operational mode. As such, vehicle 120 can have a plurality of autonomous operational modes, where each more correspondingly responds to a dynamic speed limit with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, the dynamic speed limit techniques and response can be highly, or fully, automated. For example, the dynamic speed limit module 125 can be configured to communicate a dynamic speed limit so as to operate the vehicle 120 autonomously. After the dynamic speed limit module 125 communicates a newly generated (or updated) dynamic speed limit to the vehicle 120 operating as an autonomous vehicle, the vehicle 120 can automatically perform the necessary adjustments (e.g., accelerating or decelerating) with no human driver interaction. Accordingly, vehicle 120 can travel at a speed consistent with the dynamic speed limit in a fully autonomous manner.

Alternatively or in addition to the above-described modes, vehicle 120 can have one or more semi-autonomous operational modes. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is when an adaptive cruise control system is activated. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g. by depressing the brake pedal to reduce the speed of the vehicle), the adaptive cruise control system is deactivated, and the speed of the vehicle is reduced. Thus, with vehicle 120 operating as a semi-autonomous vehicle, the dynamic speed limit techniques and response can be partially automated. In an example, the dynamic speed limit module 125 communicates a newly generated (or updated) dynamic speed limit to the vehicle 120 operating as a semi-autonomous vehicle, under adaptive cruise control features. The vehicle 120 can automatically perform the some of the necessary adjustments (e.g., accelerating) with no human driver interaction. Alternatively, the vehicle 120 may notify a driver that driver input is necessary in response to a new (or updated) dynamic speed limit. For instance, upon detecting ice on the roadway, vehicle 120 can predict a dynamic speed limit of 20 MPH, which may be substantially lower than the vehicle's 120 present speed. The dynamic speed limit may be reduced to ensure that the driver is travelling cautiously for the extreme road conditions. In response, vehicle 120 can present a notification in its dashboard display that reduced speed is required, because of the dynamic speed limit. The notification allows time for the driver to press the brake pedal and decelerate the vehicle 120 to travel at a speed consistent with the dynamic speed limit.

Alternatively or in addition to the above-described modes, the vehicle 120 can have a manual operational mode. "Manual operational mode" means that a substantial majority or all of the navigation and/or maneuvering of the vehicle 120 along a travel route is performed by a human driver with minimal or no input from (or operation of the vehicle by) a computing system. Accordingly, the vehicle 120 can employ a suitable indicator and/or output to notify the driver of the dynamic speed limit. In yet another example, after receiving a new (or updated) dynamic speed limit, an audible alert can be generated by vehicle 12. Additionally, vehicle 120 can visually present the dynamic speed limit in the dashboard display to notify a driver that driver input may be required (e.g., accelerate or decelerate) to travel at a speed consistent with the dynamic speed limit.

An example vehicle in which embodiments of the disclosed technology may be implemented is illustrated in FIG. 2. Although the example described with reference to FIG. 2 is a type of vehicle, the systems and methods for dynamic speed limits can be implemented in other types of vehicle including gasoline- or diesel-powered vehicles, fuel-cell vehicles, electric vehicles, or other vehicles.

FIG. 2 illustrates a drive system of a vehicle 120 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 120 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 120 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 120 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 2, electronic control unit 50 receives information from a plurality of sensors included in vehicle 120. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

Additionally, the one or more sensors 52 can be configured to detect, and/or sense position and orientation changes of the vehicle 120, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 3:
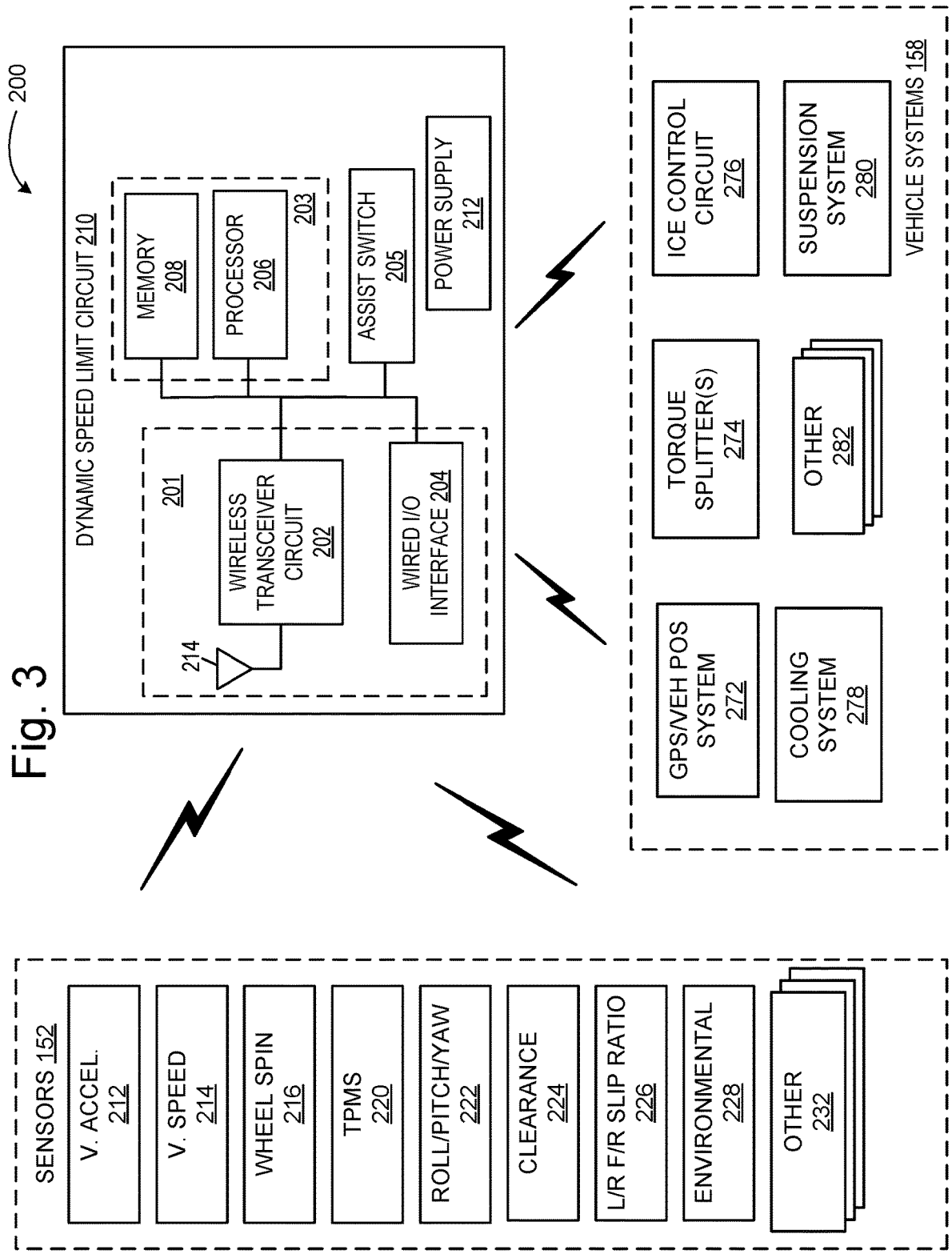
FIG. 3 illustrates an example architecture for a dynamic speed limit mode in accordance with one embodiment of the systems and methods described herein

FIG. 3 illustrates an example architecture for a dynamic speed limit mode in accordance with one embodiment of the systems and methods described herein. Referring now to FIG. 3, in this example, dynamic speed limit system 200 includes a dynamic speed limit circuit 210, a plurality of sensors 152, and a plurality of vehicle systems 158. Sensors 152 and vehicle systems 158 can communicate with dynamic speed limit circuit 210 via a wired or wireless communication interface. Although sensors 152 and vehicle systems 158 are depicted as communicating with dynamic speed limit circuit 210, they can also communicate with each other as well as with other vehicle systems. Dynamic speed limit circuit 210 can be implemented as an ECU or as part of an ECU such as, for example electronic control unit 50. In other embodiments, dynamic speed limit circuit 210 can be implemented independently of the ECU.

Dynamic speed limit circuit 210 in this example includes a communication circuit 201, a decision circuit (including a processor 206 and memory 208 in this example) and a power supply 212. Components of the dynamic speed limit circuit 210 are illustrated as communicating with each other via a data bus, although other communication in interfaces can be included. Dynamic speed limit circuit 210 in this example also includes a manual dynamic speed limit switch 205 that can be operated by the user to manually select the dynamic speed limit mode, enabling the disclosed operations in a vehicle.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to dynamic speed limit circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a dynamic speed limit circuit 210.

Communication circuit 201 either or both a wireless transceiver circuit 202 with an associated antenna 214 and a wired I/O interface 204 with an associated hardwired data port (not illustrated). As this example illustrates, communications with dynamic speed limit circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by dynamic speed limit circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 2. Sensors 152 can include additional sensors that may or not otherwise be included on a standard vehicle with which the dynamic speed limit system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of dynamic speed limit system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, dynamic speed limit circuit 210 can receive information from various vehicle sensors 152 to determine whether a dynamic speed limit should be enabled. Also, the driver may manually activate a dynamic speed limit mode by operating dynamic speed limit switch 205. Communication circuit 201 can be used to transmit and receive information between dynamic speed limit circuit 210 and sensors 152, and dynamic speed limit circuit 210 and vehicle systems 158. Also, sensors 152 may communicate with vehicle systems 158 directly or indirectly (e.g., via communication circuit 201 or otherwise).

Figure 4:
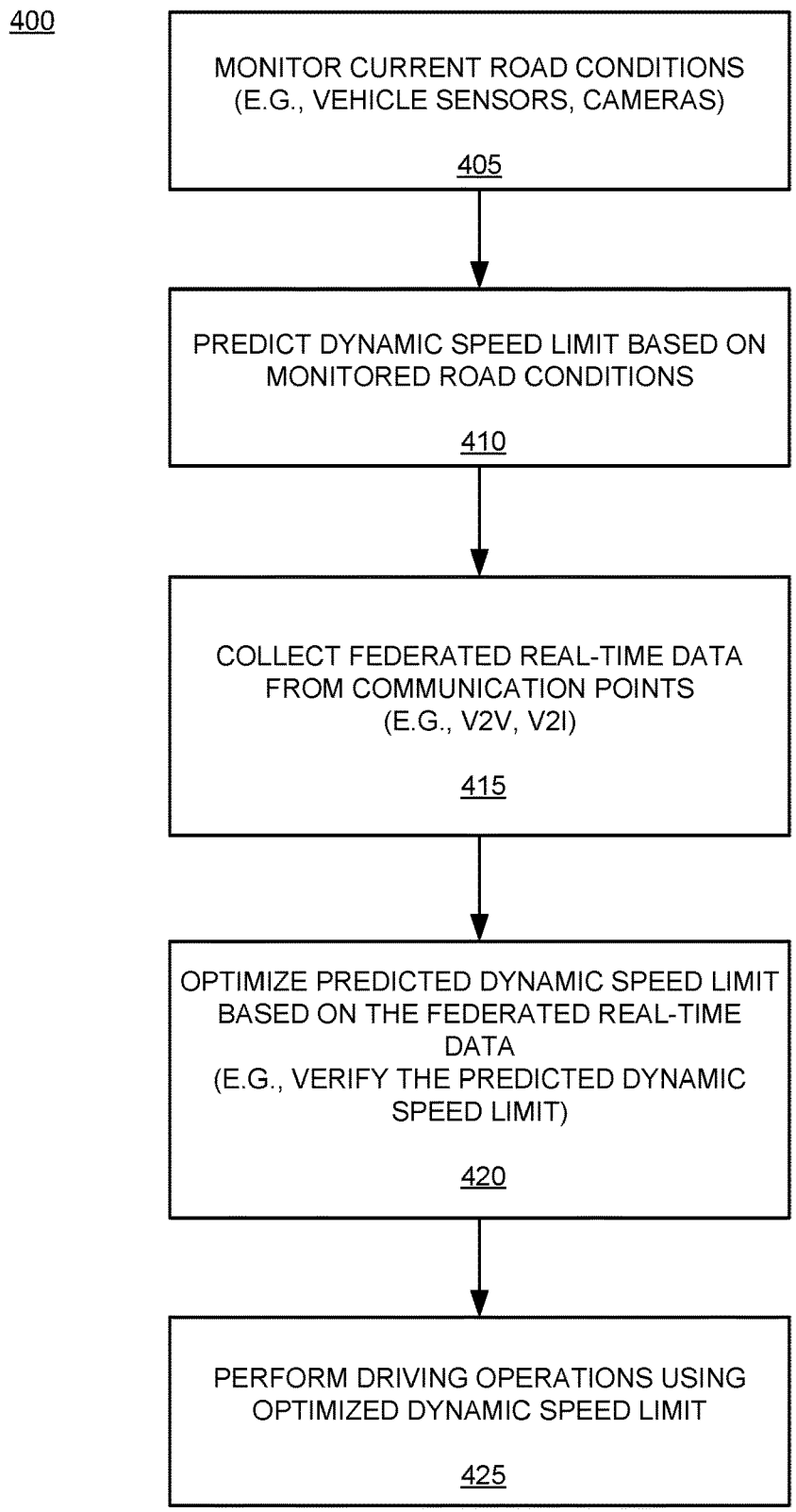
FIG. 4 is a flow chart illustrating example operations for implementing the dynamic speed limit techniques in accordance with one embodiment.

FIG. 4 is a flow chart illustrating example operations for implementing dynamic speed limit techniques in accordance with one embodiment. As described above in conjunction with FIG. 1, improved safety, uniform traffic flow, and driving optimization may be achieved by employing the dynamic speed limit techniques discloses herein. The process 400 beings at operation 405, where multiple vehicle sensors are employed to continuously monitor the current road conditions, in real-time. The monitoring of operation 405 can involve the sensors capturing real-time data pertaining to a driving environment surrounding a vehicle, such as a portion of a roadway. Thus, the real-time data can be analyzed to determine, or otherwise estimate, real-time conditions in which the vehicle is currently traveling. The road conditions detected at operation 405 may impact an appropriate speed for the vehicle, such as traffic speed, traffic volume, congestion, weather conditions, and the like. Alternatively, monitoring at operation 405 can be triggered by an event (rather than continuous), such as a time interval or traveling in a certain location. As a result of monitoring at operation 405, the vehicle has an awareness of the current, or real-time, road conditions, including any significant changes.

In an example, a front-facing camera can be used to perform the monitoring at operation 405. The camera may continuously capture real-time images of the driving environment surrounding the vehicle, thereby monitoring the current state of the roadway. In a scenario, the vehicle enters an area where it has begun to rain. The camera may be able to image rainfall surrounding the vehicle, and capture that the surface of the road ahead is wet. As a result, operation 405 can analyze the real-time image data from the camera and determine that the current road conditions have changed due to a detected change in weather, or the oncoming rain. In some instances, the techniques can include predictively estimating road conditions. For instance, an autonomous vehicle can be programmed to travel to a destination. In this case, the real-time data captured by monitoring current road conditions at operation 405, can be applied to further predict the road conditions to be anticipated at the destination.

Next, at operation 410, dynamic speed limits can be predicted based on the real-time data, which is indicative of the current road conditions. As discussed in detail in reference to FIG. 1, machine learning algorithm(s) and model(s) may be employed for predicting a dynamic speed limit. Furthermore, as previously discussed, the prediction at operation 410 may be based on a vehicle's independent monitoring of the current road conditions (e.g., without communicating with the other communication points). Nonetheless, the vehicle can leverage communicative connections to multiple other communication points, in order to apply the abovementioned federated learning aspects in process 400.

The process 400 can consider the dynamic speed limit predicted at operation 410 as an initial value, which is subject to further enhancement and/or optimization in accordance with federating learning techniques. At operation 415, a vehicle can collect federated real-time data from multiple communication points, such as nearby vehicles, infrastructure devices, and road condition services. The federated real-time data can be used to optimize the dynamic speed limit predicted at operation 401. That is, supplementing real-time data obtained directly by the vehicle at operation 405 with federated real-time data collected during operation 415 can improve the accuracy of the models, thus improving the dynamic speed limit prediction. For example, a plurality of vehicles traveling on the same road can communicate real-time imagery obtained from their respective cameras to the vehicle performing process 400, via V2V technology for instance. Referring back to the example of a vehicle approaching rain, real-time images collected from the plurality of vehicles can further indicate that there is rain in the same vicinity. Thus, the federated learning approach supports a consensus amongst the vehicles that rain is indeed present. Analyzing the federated real-time data collected at operation 415 can serve to confirm (or deny) the current road conditions, as monitored by the vehicle.

Thereafter, at operation 420, the initial predicted dynamic speed limit can be optimized using the collected federated real-time data. In some embodiments, operation 420 can involve applying the newly collected federated real-time data to the machine learning algorithm(s) and/or model(s) for predicting an optimized dynamic speed limit. In some cases, operation 420 can include employing an optimization algorithm, which generates an optimized value of the initially predicted dynamic speed limit.

In an embodiment, operation 420 involves verifying the dynamic speed limit predicted at operation 410 using the federated real-time data collected during operation 415. Verifying can be generally described as determining whether there is consensus between the real-time data obtained directly from the vehicle (e.g., operation 405) and the federated real-time data collected from the multiple communication points (e.g., operation 420). In the case where the real-time data converges, it may indicate that the initial dynamic speed limit was appropriately predicted for the current road conditions, and thus can be employed in operating the vehicle. Alternatively, in the case where the real-time data diverges, it may indicate that the initial dynamic speed limit was predicted from bad (e.g., inaccurate) data, and that the initially predicted dynamic speed limit is not verified. As an example, a vehicle may have faulty sensors, that detect rain that is not present in the current road conditions. The real-time data from the faulty sensors should diverge from the federated real-time data collected from the multiple other vehicles, in this instance. Accordingly, operation 420 will not verify the initial dynamic speed limit, predicted from the inaccurate data. In some cases, the optimization at operation 420 is performed in response to the failed verification of an initial dynamic speed limit.

In some embodiments, the processing associated with federated learning and optimization is performed by edge compute nodes. Consequently, process 400 can be further optimized by alleviating some of the stress of centralized processing, by distributing some portion of the processing to logical extremes, or edge nodes, of the network. In another embodiment, operation 420 involves employing big data analytics. Big data analytics can be performed by collecting and monitoring the real-time data over time, in some instances by back-end computer systems (e.g., having larger data processing capacities as compared to vehicles). The back-end computer systems may push the big data analytics regarding speed predictions to the vehicles, to be used in process 400.

Next, at operation 425, a driving operation can be performed using the optimized dynamic speed limit. Operation 425 can involve automatically performing the driving operation, where the driving operation causes the vehicle to move at a driving speed that is approximately equal to the predicted dynamic speed limit. In an autonomous vehicle, the vehicle can perform fully automated functions to operate the vehicle in accordance with the dynamic speed limit. Also, vehicles having some automated capabilities (e.g., semi-autonomous operational mode), such as adaptive cruise control can perform semi-autonomous functions to drive the vehicle in accordance with the dynamic speed limit. That is, a driver may have to press the brake to deactivate the adaptive cruise control and decelerate, so as to operate the vehicle at the dynamic speed limit.

In another embodiment, there may be varying levels associated with the dynamic speed limit, which determines the actions performed at operation 425. For instance, a dynamic speed limit may be at a recommended level (e.g., displayed as a yellow alert). A recommended level can indicate that there may not be any immediate safety concerns in electing not to drive the vehicle in response to the dynamic speed limit. Consequently, a vehicle can automatically generate an alert notifying the driver of the dynamic speed limit, but ultimately allow the driver to decide whether to operate the vehicle in response to a recommended dynamic speed limit. In some embodiments, a dynamic speed limit that is unverified is automatically set at the recommended level. Other dynamic speed limits may be at a mandatory level (e.g., displayed as a red alert), indicating that there may be imminent danger if the dynamic speed limit is not adhered to. In the case of a mandatory level, the vehicle's response may be automated and not require the driver's input to drive the vehicle at the dynamic speed limit. Additionally, a dynamic speed limit set at a mandatory level may also trigger certain features of a collision avoidance system in equipped vehicles.

Figure 5:
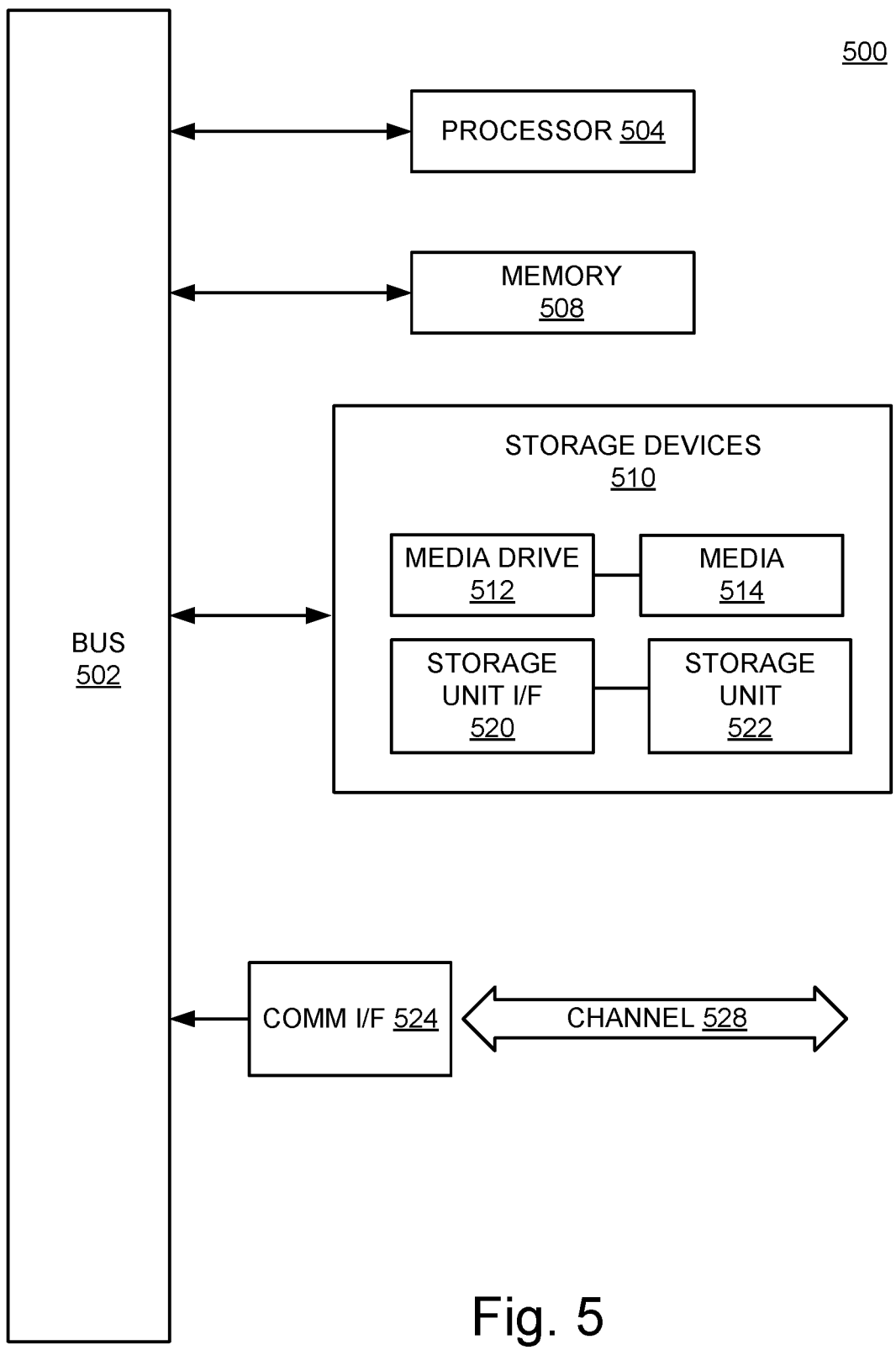
FIG. 5 is an example computing component that may be used to implement various features of embodiments described in the present disclosure.

As discussed above, back-end computer systems, such as multiple remote servers, can implement the dynamic speed limit techniques described, leveraging high-performance computing and big data capabilities. Referring now to FIG. 5, computing component 500 may represent, for example, such computing or processing capabilities. Computing component 500 may be found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up user device 502, user system 504, and non-decrypting cloud service 506. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    monitoring, by a vehicle, current road conditions using captured real-time data indicative of a driving environment associated with a roadway being traversed by the vehicle, wherein monitoring the current road conditions comprises:
        capturing the real-time data from one or more vehicle sensors of the vehicle, wherein the captured real-time data is from one or more vehicle sensors sensing the current road conditions associated with the roadway being traversed by the vehicle; and
        collecting federated real-time data from multiple communication points communicatively connected to the vehicle and a plurality of dynamic speed limits predicted by other vehicles, the federated real-time data indicating the driving environment associated with the roadway being traversed by the vehicle, and wherein collecting the federated real-time data and the plurality of dynamic speed limits predicted by other vehicles comprises receiving data via vehicle-to-vehicle (V2V) communication between the vehicle and one or more other vehicles on the roadway;
    predicting, by the vehicle, a dynamic speed limit based on the captured real-time data from the one or more vehicle sensors of the vehicle, wherein the predicted dynamic speed limit comprises a driving speed for the vehicle that is adapted for the monitored current road conditions;
    optimizing the predicted dynamic speed limit by applying the federated real-time data and the plurality of dynamic speed limits predicted by other vehicles to analysis of the dynamic speed limit to generate an optimized dynamic speed limit when the predicted dynamic speed limit is not verified; and
    automatically performing a driving operation for the vehicle in accordance with the optimized dynamic speed limit, wherein the driving operation causes the vehicle to move at the driving speed that is approximately equal to the optimized dynamic speed limit when the predicted dynamic speed limit is not verified.

2. The method of claim 1, wherein predicting the dynamic speed limit comprises applying the captured real-time data to one or more machine learning models.

3. The method of claim 2, further comprising:
    determining whether the predicted dynamic speed limit is verified based on the federated real-time data, wherein determining that the predicted dynamic speed limit is verified comprises identifying a convergence between the federated real-time data and the captured real-time data and determining that the predicted dynamic speed limit is not verified comprises identifying a divergence between the federated real-time data and the captured real-time data;
    upon determining that the predicted dynamic speed limit is not verified, generating the optimized dynamic speed limit, wherein the optimized dynamic speed limit is based on the predicted dynamic speed limit and optimally adapted to the monitored current road conditions in accordance with federated learning techniques applied to the one or more machine learning models; and
    upon determining that the predicted dynamic speed limit is not verified, performing the driving operation for the vehicle in accordance with the optimized dynamic speed limit, wherein the driving operation causes the vehicle to move at the driving speed that is approximately equal to the optimized dynamic speed limit.

4. The method of claim 1, wherein performing the driving operation for the vehicle in accordance with the predicted dynamic speed limit is fully autonomous.

5. The method of claim 1, wherein performing the driving operation for the vehicle in accordance with the predicted dynamic speed limit is semi-autonomous.

6. The method of claim 5, wherein performing the driving operation for the vehicle in accordance with the predicted dynamic speed limit comprises automatically displaying the predicted dynamic speed limit in a dashboard display of the vehicle.

7. The method of claim 1, wherein the collecting federated real-time data from multiple communication points further comprises vehicle-to-infrastructure (V2I) communication between the vehicle and an infrastructure device.

8. The method of claim 3, further comprising:
   upon determining that the predicted dynamic speed limit is verified, performing the driving operation for the vehicle in accordance with the predicted dynamic speed limit, wherein the driving operation causes the vehicle to move at the driving speed that is approximately equal to the predicted dynamic speed limit.

\* \* \* \* \*